United States Patent
Shehu et al.

(10) Patent No.: US 11,142,254 B2
(45) Date of Patent: Oct. 12, 2021

(54) SYSTEM OF A SEALED AND REINFORCED STRUCTURAL ELEMENT

(71) Applicant: SIKA TECHNOLOGY AG, Baar (CH)

(72) Inventors: Ardi Shehu, Rotselaar (BE); Vincent Belpaire, Uccle (BE)

(73) Assignee: SIKA TECHNOLOGY AG, Baar (CH)

( * ) Notice: Subject to any disclaimer, the term of this patent is extended or adjusted under 35 U.S.C. 154(b) by 93 days.

(21) Appl. No.: 16/637,300

(22) PCT Filed: Jul. 25, 2018

(86) PCT No.: PCT/EP2018/070117
§ 371 (c)(1),
(2) Date: Feb. 7, 2020

(87) PCT Pub. No.: WO2019/029989
PCT Pub. Date: Feb. 14, 2019

(65) Prior Publication Data
US 2020/0247473 A1    Aug. 6, 2020

(30) Foreign Application Priority Data

Aug. 7, 2017   (EP) .................................... 17185134

(51) Int. Cl.
*B62D 25/04*  (2006.01)
*B62D 25/16*  (2006.01)
*B62D 29/04*  (2006.01)

(52) U.S. Cl.
CPC ............. *B62D 25/04* (2013.01); *B62D 25/16* (2013.01); *B62D 29/043* (2013.01)

(58) Field of Classification Search
CPC ....... B62D 25/04; B62D 25/16; B62D 29/043
See application file for complete search history.

(56) References Cited

U.S. PATENT DOCUMENTS

| 2012/0153669 | A1* | 6/2012 | Nagwanshi | .......... B62D 29/005 296/187.08 |
| 2014/0203592 | A1* | 7/2014 | Nagwanshi | .......... B62D 29/001 296/187.01 |

(Continued)

FOREIGN PATENT DOCUMENTS

| DE | 10137028 A1 | 2/2003 |
| EP | 1132644 A2 | 9/2001 |

(Continued)

OTHER PUBLICATIONS

Nov. 12, 2018 International Search Report issued in International Patent Application No. PCT/EP2018/070117.

*Primary Examiner* — D Glenn Dayoan
*Assistant Examiner* — Melissa Ann Bonifazi
(74) *Attorney, Agent, or Firm* — Oliff PLC

(57) ABSTRACT

A system of a sealed and reinforced structural element of a motor vehicle includes: a structural element, which has a cavity with a longitudinal axis; a carrier. A first material for reinforcing the structural element, wherein the first material has a modulus of elasticity of at least 100 MPa; and a second material for sealing the structural element, wherein the second material has a modulus of elasticity of at most 20 MPa.

14 Claims, 5 Drawing Sheets

(56) References Cited

U.S. PATENT DOCUMENTS

2015/0166136 A1* 6/2015 Richardson ............ B62D 65/02
                                                    296/187.02
2017/0158252 A1* 6/2017 Milne ....................... B32B 3/12
2018/0037703 A1* 2/2018 Richardson ......... B29C 44/3484

FOREIGN PATENT DOCUMENTS

| EP | 1975006 A1 | 10/2008 |
| EP | 2019027 A1 | 1/2009 |
| EP | 2151369 A1 | 2/2010 |
| WO | 01/83206 A1 | 11/2001 |

* cited by examiner

SYSTEM OF A SEALED AND REINFORCED STRUCTURAL ELEMENT

The invention relates to a system of a sealed and reinforced structural element of a motor vehicle and an element for sealing and reinforcing structural elements.

In many cases, components, such as for example bodies and/or frames of transportation and conveyance means, in particular of motor vehicles, have structures with cavities in order to make lightweight constructions possible. However, these cavities cause a wide variety of problems. Depending on the nature of the cavity, it must be sealed to prevent the ingress of moisture and dirt, which can lead to corrosion of the components. It is often also desirable to reinforce the cavities, and consequently the component, but to retain the low weight of this type of construction. It is often also necessary for the cavities, and consequently the components, to be stabilized in order for noises which would otherwise be transmitted along or through the cavity to be reduced. Moreover, many of these cavities have an irregular shape or a narrow extent, making it more difficult to seal, reinforce or insulate them properly.

In particular in automotive construction, but also in aircraft construction and boat building, sealing elements (baffles) are therefore used in order to seal and/or acoustically isolate cavities, and reinforcing elements (reinforcers) are used in order to reinforce cavities.

The invention is based on the object of providing an improved system for sealing and reinforcing structural elements in motor vehicles. In particular, the system should be less expensive and easier to handle than conventional known systems.

This object is first achieved by a system of a sealed and reinforced structural element of a motor vehicle, the system comprising: a structural element, which has a cavity with a longitudinal axis; a carrier with a first side and a second side and with a first edge region and a second edge region, wherein the edge regions are each facing the structural element, and wherein the first side and the second side are each arranged orthogonal to the longitudinal axis of the structural element; a first material for reinforcing the structural element, which is arranged at least between the first edge region of the carrier and the structural element, wherein the first material has a modulus of elasticity of at least 100 MPa; and a second material for sealing the structural element, which is arranged at least between the second edge region of the carrier and the structural element, wherein the second material has a modulus of elasticity of at most 20 MPa.

The system proposed here offers the advantage that a structural element can be both reinforced and sealed with just one component. As a result, the functions of conventional baffles and of conventional reinforcers can be undertaken simultaneously with one component. For certain applications, the system proposed here allows two conventional components, in particular a baffle and a reinforcer, to be replaced by a single component which can perform both functions. This leads on the one hand to weight savings, but also to cost advantages and simplified processes in the manufacture of motor vehicles.

A central idea of the present invention is that, in particular in regions of the body in which both a reinforcing function and a sealing function are required, both functions can be integrated in a specific manner in a single component. It has in this respect been found in tests that this can be achieved particularly efficiently by the system proposed here, in which a reinforcing function is arranged at a first edge region of the carrier and in which a sealing function is arranged at a second edge region of the carrier. In this case, the carrier is preferably of a flat design, so that it is substantially shaped in the same way as conventional baffles.

By the use of such flat carriers that close the cavity of the structural element, the sealing function can be achieved in a simple manner. It has thus been found in tests that, by replacing conventional sealing material with reinforcing material at certain points of the carrier, a reinforcing function can be achieved in addition to the sealing function.

In the context of this invention, the term "orthogonal to the longitudinal axis" means that the first and second sides are substantially aligned such that a longitudinal axis of the structural element is substantially perpendicular to these sides of the carrier. In this case, the longitudinal axis does not have to be exactly perpendicular to these sides of the carrier, in particular in situations in which the structural element is irregularly shaped and/or in situations in which the first and second sides of the carrier are irregularly shaped. What is meant by the term is therefore that the carrier is arranged in the structural element in such a way that the first side of the carrier and the second side of the carrier lie substantially in a cross section of the structural element.

The first material for reinforcing the structural element has a modulus of elasticity of at least 100 MPa. In a development, the first material has a modulus of elasticity of at least 200 MPa, preferably of at least 400 MPa.

The second material for sealing the structural element has a modulus of elasticity of at most 20 MPa. In a development, the second material has a modulus of elasticity of at most 10 MPa, preferably of at most 5 MPa.

The stated values of the first material and the second material with regard to their modulus of elasticity refer to the first material and the second material in their state of use in the motor vehicle. This means that the values are indicated in particular after a possible expansion of the materials and after a possible curing of the materials.

In an embodiment given by way of example, the carrier and the structural element are adhesively bonded to one another by the first material and/or by the second material. Such adhesive bonding of the carrier to the structural element can be brought about in particular by a possible expansion and a possible curing of the first and second materials.

In an embodiment given by way of example, the carrier has a thickness, measured in the direction of the longitudinal axis of the cavity, of 5 to 50 mm, preferably of 5 to 40 mm, particularly preferably of 10 to 30 mm.

The provision of such "flat" carriers has the advantage that, as a result, on the one hand lightweight carriers can be provided and on the other hand such carriers in the form of conventional baffles are suitable in particular for the sealing of structural elements.

In an embodiment given by way of example, the first side and the second side of the carrier each form a closed surface, or the first side and the second side have passages which are sealed by the first material and/or the second material.

For the sealing function of the component, it is advantageous if a cross section of the structural element is completely closed by the overall entity comprising the carrier, the first material and the second material.

In an embodiment given by way of example, a cross section of the structural element is completely sealed by the carrier, the first material and the second material.

In an embodiment given by way of example, the carrier has ribs for mechanicallly reinforcing the carrier.

In a development given by way of example, the ribs are arranged on the first side of the carrier or on the second side of the carrier.

In a development given by way of example, the ribs extend from one edge region of the carrier to a substantially opposite edge region of the carrier.

The provision of such ribs offers the advantage that, as a result, the carrier itself can be mechanically reinforced. Such a mechanically reinforced carrier can thereby provide a better mechanical reinforcement of the structural element.

In an embodiment given by way of example, the carrier consists at least partially of plastic or of glass-fiber reinforced plastic or of carbon-fiber reinforced plastic.

Carriers of the materials mentioned have the advantage that on the one hand they are lightweight and on the other hand they can withstand high mechanical loads.

In an embodiment given by way of example, the first material comprises an adhesive that is curable by a temperature of more than 120° C.

In an embodiment given by way of example, the first material has an expansion rate of less than 500%, or the first material is a non-expandable material.

Scarcely expandable or non-expandable materials offer the advantage that, as a result, the material does not lose too much mechanical stability during expansion. In principle, a material becomes mechanically weaker the more the material is expanded.

Examples of the first material are in particular SikaReinforcer®-940 or SikaPower®-497. SikaReinforcer®-940 is an example of an expandable material, while SikaPower®-497 is an example of a non-expandable material.

In the context of this invention, the term "non-expandable" means that a material does not change its volume by more or less than 10% during the process steps provided for the material. For example, non-expandable adhesives may shrink slightly during curing. Such a change in volume during curing is considered to be "non-expandable" in the context of this application.

In an embodiment given by way of example, the second material comprises an adhesive that is curable by a temperature of more than 120° C.

In an embodiment given by way of example, the second material has an expansion rate of more than 500%, preferably of more than 1000%, particularly preferably of more than 1500%. In an alternative embodiment, the first material is a non-expandable material.

Examples of the second material are in particular SikaBaffle®-450 or Sikaflex®-254. SikaBaffle®-450 is a second material given by way of example, with an expansion rate of more than 500%, and Sikaflex®-254 is a second material given by way of example, which is not expandable.

In an embodiment given by way of example, the first material is arranged in a first region of the structural element, which forms a non-visible surface of the motor vehicle, and/or the second material is arranged at least in a second region of the structural element, which forms a visible surface of the motor vehicle.

Such an arrangement of the first material and the second material with respect to visible surfaces and non-visible surfaces of the motor vehicle offers the advantage that the second material usually leads to less deformation of the structural element. Therefore, it is advantageous to use the first material in regions of the structural element that are not visible and to use the second material at least in regions of the structural element that are visible from the outside.

In an embodiment given by way of example, the first material and the second material are each expandable materials, and the carrier has a separating element, which separates the first material and the second material from one another prior to expansion of the first material and the second material.

The provision of such a separating element on the carrier has the advantage that, as a result, when applying the first material and the second material to the carrier prior to their expansion, a region for the arrangement of the first material and the second material on the carrier is more controllable.

In an embodiment given by way of example, the first material and the second material are at least 2 to 20 mm apart prior to expansion.

In an embodiment given by way of example, the structural element is a component part of a C-pillar, a D-pillar or a wheel arch of a body of the motor vehicle.

Reinforcing and sealing with the system proposed here at the stated locations of the body of the motor vehicle has the advantage that both a sealing function and a reinforcing function of the body are desirable at these locations. It has been found that the usefulness of the system proposed here is particularly great at these locations.

In an embodiment given by way of example, at the first edge region and/or at the second edge region, the carrier forms an extension, which runs substantially parallel to the first side and the second side of the carrier.

The provision of such an extension has the advantage that, as a result, the application of the first material and the second material to the carrier can be facilitated, and that moreover, in a possible expansion of the first material or the second material, a direction of expansion can be directed through this extension.

Details and advantages of the invention will be described below on the basis of exemplary embodiments and with reference to schematic drawings, in which.

Figure 1:
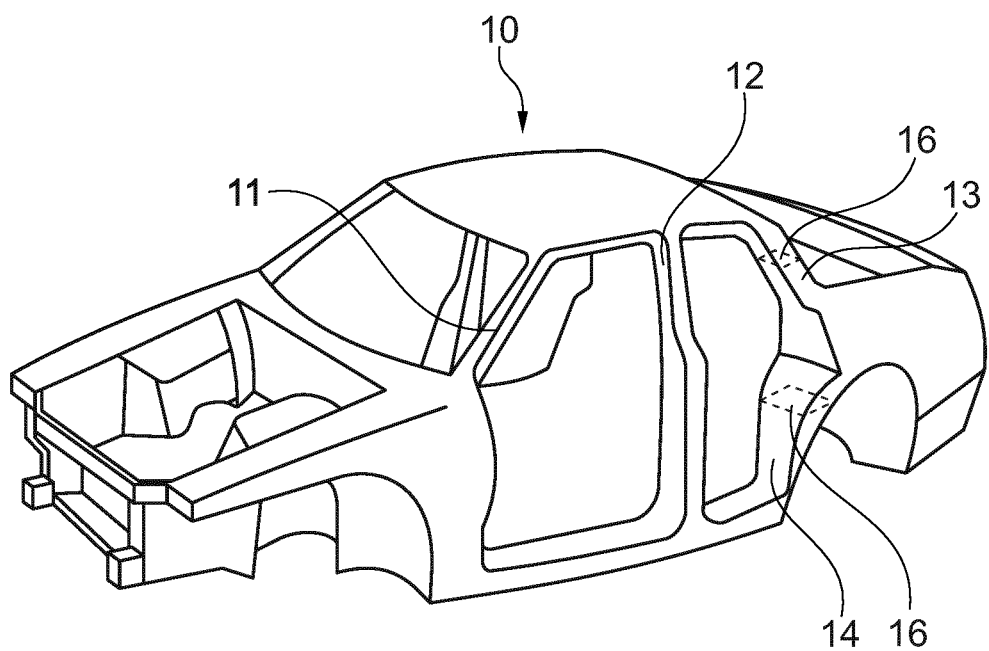
FIG. 1 shows a schematic representation, given by way of example, of a body of a motor vehicle.

In FIG. 1, a body 10 of an automobile is schematically shown. The body 10 has in this case various structures with cavities, such as for example the A-pillar 11, the B-pillar 12, the C-pillar 13 or the wheel arch 14. Such structures with cavities may then be sealed and reinforced by elements 16.

Figure 2:
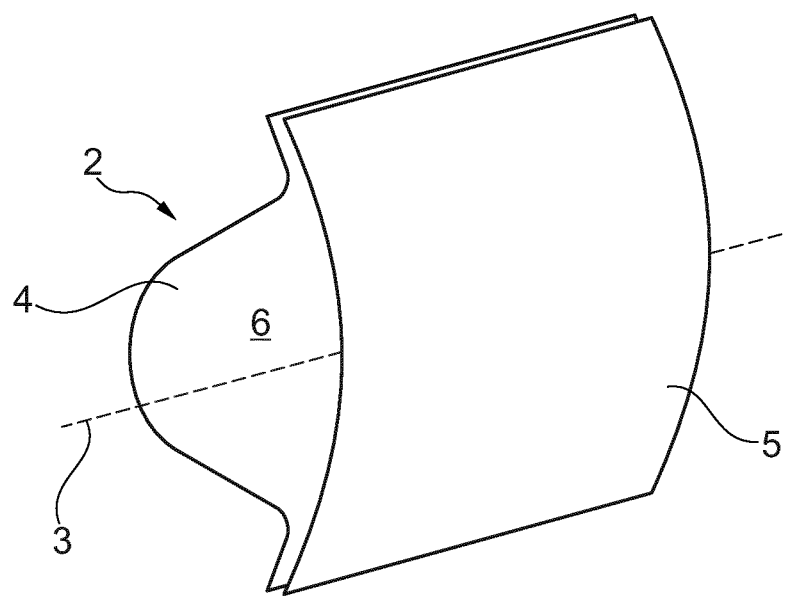
FIG. 2 shows a schematic portion of a structural element, given by way of example, of a motor vehicle.

In FIG. 2, a portion of a structural element 2, given by way of example, is schematically shown. In this case, the structural element 2 has a cavity 6, which lies between a first region 4 and a second region 5. The first region 4 may be for example a first metal sheet and the second region 5 may be for example a second metal sheet. In this case, the sheets may be connected to one another at joining locations, as shown in FIG. 2. Furthermore, the cavity 6 or the structural element 2 has a longitudinal axis 3.

Figure 3:
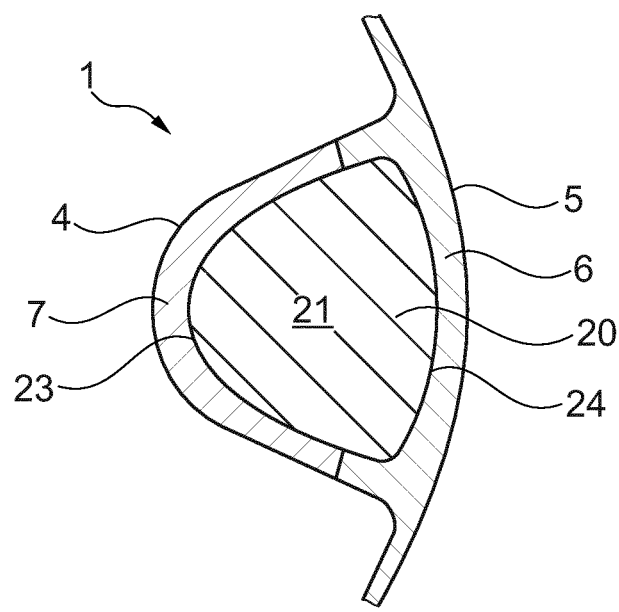
FIG. 3 shows a schematic cross section through a system, given by way of example, of a sealed and reinforced structural element.

In FIG. 3, a system 1 of a sealed and reinforced structural element 2 is then shown. In this case, a carrier 20 is arranged in the cavity of the structural element 2, the carrier 20 comprising a first side 21, a second side (not visible in this representation), a first edge region 23 and a second edge region 24. The first material 7 is arranged between the first edge region 23 and the structural element 2, and the second material 8 is arranged between the second edge region 24 and the structural element 2.

In this exemplary embodiment, the first material 7 is only in contact with the first region 4 of the structural element 2, whereas the second material 8 is in contact both with the first region 4 and with the second region 5 of the structural element. For example, the first region 4 may be a non-visible region of the body, and the second region 5 may be a visible region of the body.

Various exemplary embodiments of elements 16 for sealing and reinforcing structural elements are shown in FIGS. 4a to 6b. In this case, the elements 16 each comprise a carrier 20 and a first material 7 and second material 8 arranged thereon. The first material 7 and the second material 8 are in this case each shown in an unexpanded and uncured state. The carrier 20 has in each case a first side 21 and a second side 22 opposite from the first side 21. Moreover, the carrier 20 has in each case a first edge region 23, at which the first material 7 is arranged, and a second edge region 24, at which the second material 8 is arranged.

Furthermore, the carrier 20 has a fastening element 25, which may be designed in particular as a clip. This fastening element 25 allows the element 16 to be fastened in the structural element before the first material 7 and the second material 8 expand and/or cure.

Moreover, it can be seen in the exemplary embodiments shown in that the carrier 20 may have at the edge regions 23, 24 an extension 26, on which the first material 7 and/or the second material 8 is supported. This extension 26 also serves in particular for guiding the first material 7 and/or the second material 8 during their expansion.

Figure 4A:
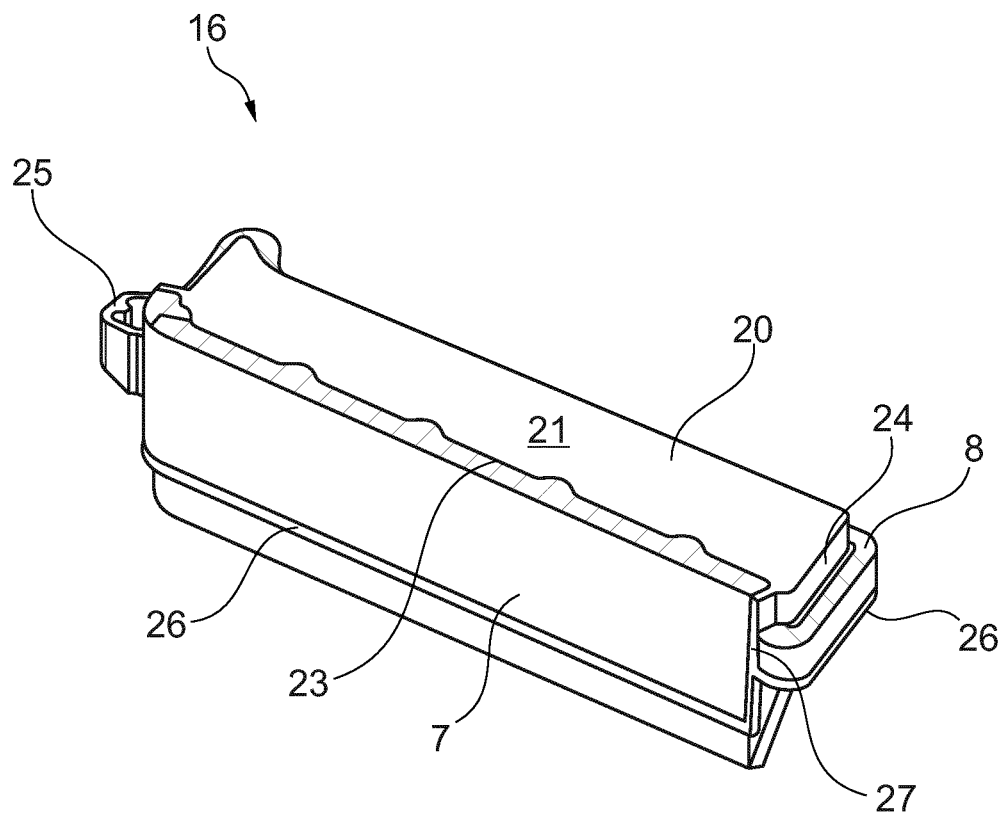
FIGS. 4a to 6b show schematic embodiments, given by way of example, of an element for sealing and reinforcing a structural element.
Figure 4B:
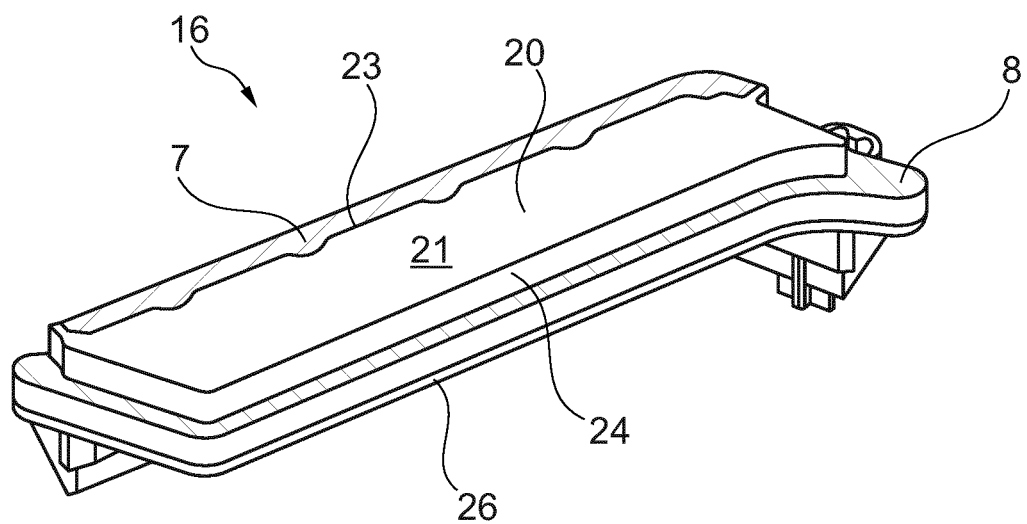

The exemplary embodiment shown in FIGS. 4a and 4b comprises a carrier 20, which is formed as elongate and which lies substantially in one plane.

Figure 5A:
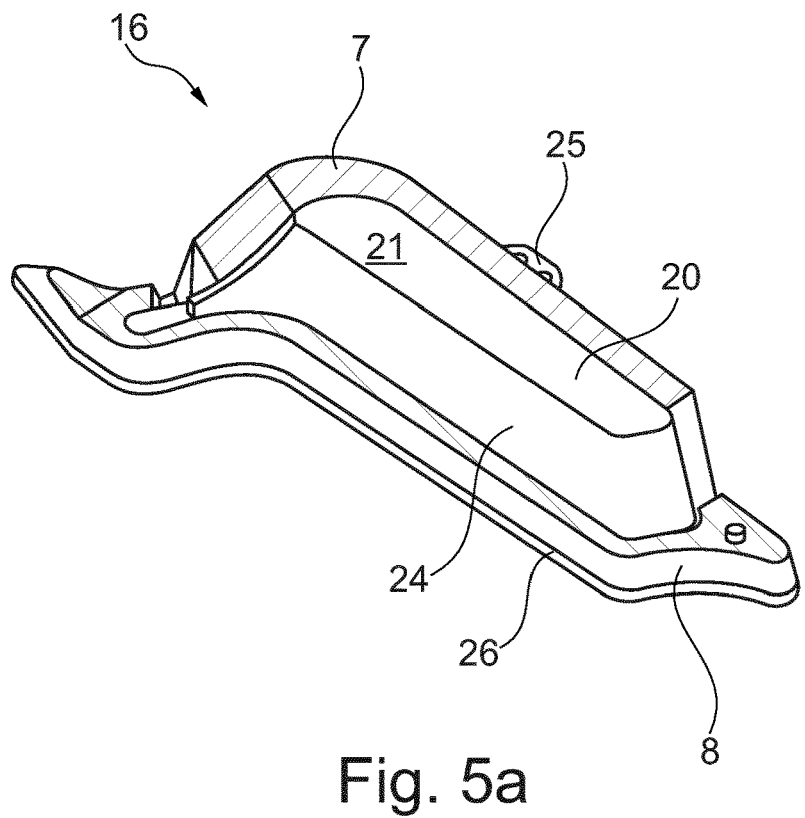
Figure 5B:
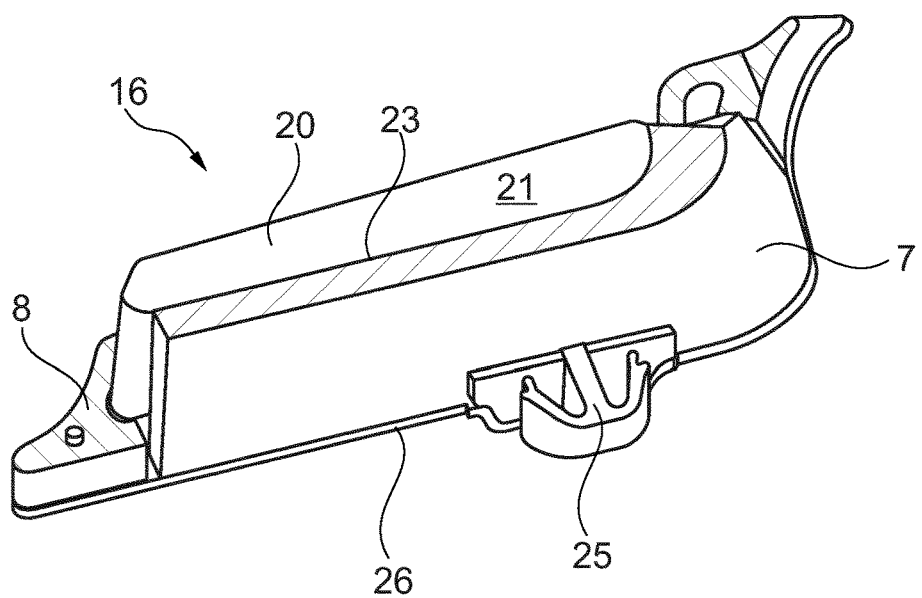

The exemplary embodiment shown in FIGS. 5a and 5b also includes an elongate carrier. In this exemplary embodiment, the carrier is formed as flattened at its ends.

Figure 6A:
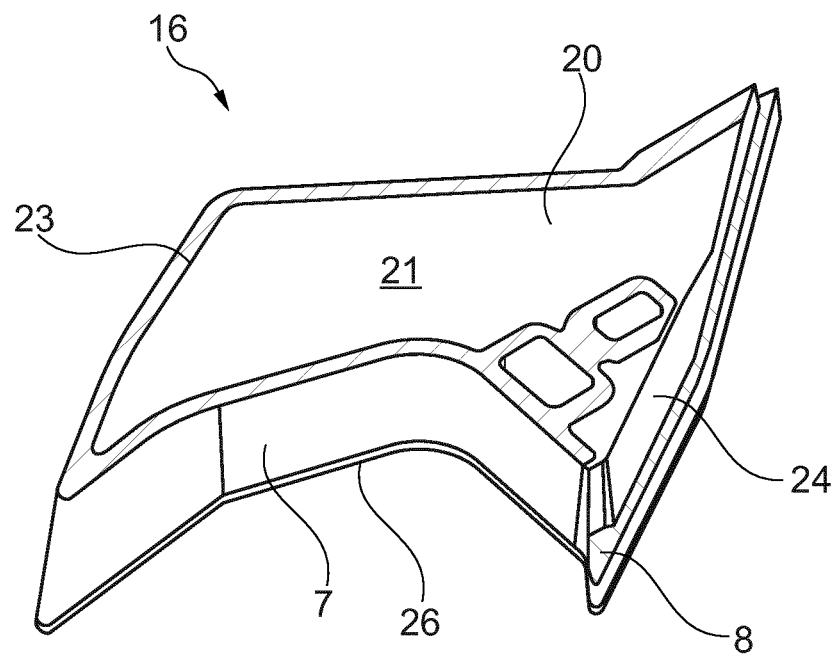
Figure 6B:
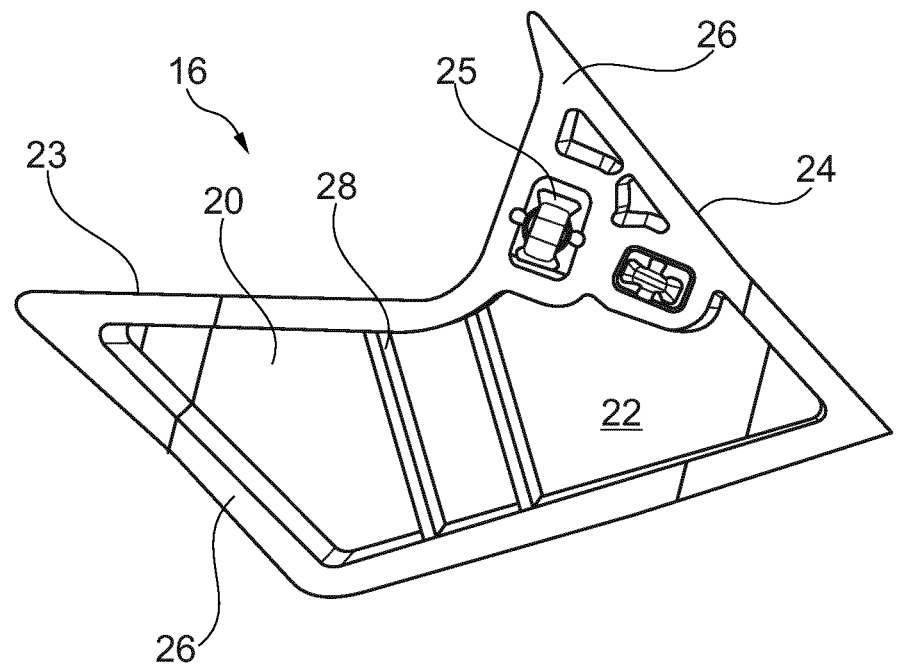

The exemplary embodiment shown in FIGS. 6a and 6b comprises a carrier 20, which is not arranged in one plane. The carrier 20 in this exemplary embodiment has in particular a corner, which is designed as angled out of the general plane of the carrier. Moreover, the carrier in FIGS. 6a and 6b is provided with ribs 28. It can also be seen in FIG. 6b that the extension 26 can extend around the entire periphery of the carrier 20. It can also be seen in FIG. 6a that the carrier 20 can have passages, which however are closed by the first material 7 and/or the second material 8 in their expanded state.

LIST OF REFERENCE SIGNS

1 System
2 Structural element
3 Longitudinal axis of the structural element
4 First region (not visible)
5 Second region (visible)
6 Cavity
7 First material
8 Second material
10 Body
11 A-pillar
12 B-pillar
13 C-pillar
14 Wheel arch
16 Element
20 Carrier
21 First side
22 Second side
23 First edge region
24 Second edge region
25 Fastening element
26 Extension
27 Separating element
28 Ribs

The invention claimed is:

1. A system of a sealed and reinforced structural element of a motor vehicle, the system comprising:
   a structural element, which has a cavity with a longitudinal axis;
   a carrier with a first side and a second side and with a first edge region and a second edge region, wherein the edge regions are each facing the structural element, and wherein the first side and the second side are each arranged orthogonal to the longitudinal axis of the structural element;
   a first material for reinforcing the structural element, which is arranged at least between the first edge region of the carrier and the structural element, wherein the first material has a modulus of elasticity of at least 100 MPa; and
   a second material for sealing the structural element, which is arranged at least between the second edge region of the carrier and the structural element, wherein the second material has a modulus of elasticity of at most 20 MPa.

2. The system as claimed in claim 1, wherein the carrier has a thickness, measured in the direction of the longitudinal axis of the cavity, of 5 to 50 mm.

3. The system as claimed claim 1, wherein the first side and the second side of the carrier each form a closed surface, or wherein the first side and the second side have passages which are sealed by the first material and/or the second material.

4. The system as claimed in claim 1, wherein a cross section of the structural element is completely sealed by the carrier, the first material and the second material.

5. The system as claimed in claim 1, wherein the carrier has ribs for mechanically reinforcing the carrier.

6. The system as claimed in claim 1, wherein the carrier consists at least partially of plastic or of glass-fiber reinforced plastic or of carbon-fiber reinforced plastic.

7. The system as claimed in claim 1, wherein the first material comprises an adhesive that is curable by a temperature of more than 120° C. and/or
   wherein the first material has an expansion rate of less than 500% or is a non-expandable material.

8. The system as claimed in claim 1, wherein the second material comprises an adhesive that is curable by a temperature of more than 120° C. and wherein the second material is a non-expandable material; or
   wherein the second material has an expansion rate of more than 500%.

9. The system as claimed in claim 1, wherein the first material is arranged in a first region of the structural element, which forms a non-visible surface of the motor vehicle, and/or
   wherein the second material is arranged at least in a second region of the structural element, which forms a visible surface of the motor vehicle.

10. The system as claimed in claim 1, wherein the first material and the second material are each expandable materials, and wherein the carrier has a separating element, which separates the first material and the second material from one another prior to expansion of the first material and the second material.

11. The system as claimed in claim 10, wherein the first material and the second material are at least 2 to 20 mm apart prior to expansion.

12. The system as claimed in claim 1, wherein, at the first edge region and/or at the second edge region, the carrier forms an extension, which runs substantially parallel to the first side and the second side of the carrier.

13. The system as claimed in claim 1, wherein the structural element is a component part of a C pillar, a D-pillar or a wheel arch of a body of the motor vehicle.

14. An element for sealing and reinforcing a structural element, wherein the element is suitable for use in a system as claimed in claim 1, and wherein the element comprises a carrier with a first side and a second side and with a first edge region and a second edge region, wherein the edge regions are each facing the structural element, and wherein the first side and the second side are each arranged orthogonal to the longitudinal axis of the structural element;

- a first material for reinforcing the structural element, which is arranged at least between the first edge region of the carrier and the structural element, wherein the first material has a modulus of elasticity of at least 100 MPa; and a second material for sealing the structural element, which is arranged at least between the second edge region of the carrier and the structural element, wherein the second material has a modulus of elasticity of at most 20 MPa.

* * * * *